(12) United States Patent
Trpkovski (10) Patent No.: US 6,216,751 B1
(45) Date of Patent: Apr. 17, 2001

(54) METHOD OF RELIABLY DETECTING SEAL FAILURES

(75) Inventor: Paul Trpkovski, Loganville, WI (US)

(73) Assignee: Cardinal IG Company, Minnetonka, MN (US)

( * ) Notice: Subject to any disclaimer, the term of this patent is extended or adjusted under 35 U.S.C. 154(b) by 0 days.

(21) Appl. No.: 09/441,687

(22) Filed: Nov. 16, 1999

Related U.S. Application Data (60) Continuation-in-part of application No. 09/286,349, filed on Apr. 5, 1999, which is a division of application No. 08/957,532, filed on Oct. 24, 1997, now Pat. No. 5,957,169.

(51) Int. Cl.[7] ......................................................... B65B 1/04
(52) U.S. Cl. ................................. 141/7; 141/63; 141/129; 141/59; 141/83
(58) Field of Search ............................... 141/4, 7, 59, 65, 141/66, 63, 129, 368, 369, 83; 156/99, 102, 382, 580, 107

(56) References Cited

U.S. PATENT DOCUMENTS

| | | | |
|---|---|---|---|
| 4,247,355 | * 1/1981 | Friedrick et al. | 156/580 |
| 4,369,084 | * 1/1983 | Lisec | 156/580 |
| 4,780,164 | 10/1988 | Rueckheim et al. | 156/104 |
| 5,017,252 | 5/1991 | Aldrich et al. | 156/104 |
| 5,366,574 | * 11/1994 | Lenhardt et al. | 156/102 |
| 5,413,156 | 5/1995 | Lisec | 141/165 |
| 5,476,124 | 12/1995 | Lisec | 141/4 |
| 5,573,618 | 11/1996 | Rueckheim | 156/104 |
| 5,626,712 | 5/1997 | Lisec | 156/497 |
| 5,645,678 | * 7/1997 | Lisec | 156/382 |
| 5,676,782 | 10/1997 | Lisec | 156/109 |

FOREIGN PATENT DOCUMENTS

| | | |
|---|---|---|
| 3115566 | 10/1982 | (DE) . |
| 3402323 | 8/1985 | (DE) . |
| 4315986 | 11/1994 | (DE) . |
| 29504900 | 3/1995 | (DE) . |
| 0056762 | 7/1982 | (EP) . |
| 2099057 | 11/1981 | (GB) . |

\* cited by examiner

Primary Examiner—Steven O. Douglas
(74) Attorney, Agent, or Firm—Fredrikson & Byron, P.A.

(57) ABSTRACT

A method for detecting seal failures during manufacture of an insulated glass unit. In this method, a partially assembled glass unit is placed within an enclosure and the enclosure is sealed with the partially assembled glass unit therein. An insulating gas is flowed into and an insulating gas/air mixture is exhausted from the enclosure until the concentration of insulating gas within the enclosure reaches a predetermined value. The pressure within the interpane space is adjusted to a predetermined ambient gauge pressure which represents a predetermined offset from ambient atmospheric pressure. The panes are pressed against the spacer, sealing the interpane space to yield a sealed insulated glass article. Surface profiles of the first and second panes of the sealed insulated glass article are measured to determine a thickness profile. A fault indicator is generated if the thickness profile does not show at least a predetermined deviation of the thickness profile from a predetermined baseline profile.

44 Claims, 8 Drawing Sheets

METHOD OF RELIABLY DETECTING SEAL FAILURES

The present application is a continuation-in-part of U.S. patent application Ser. No. 09/286,349, filed on Apr. 5, 1999 which is a division of U.S. patent application Ser. No. 08/957,532 filed on Oct. 24, 1997 (now U.S. Pat. No. 5,957,169), the teachings of both of which are incorporated herein in their entirety by reference thereto.

FIELD OF THE INVENTION

This invention relates to insulating glass assemblies which may not have uniform sizes or shapes that are filled with an insulating gas such as argon or air, and specifically to a method for detecting seal imperfections or failures in such insulating glass assemblies.

BACKGROUND OF THE INVENTION

Insulating glass assemblies for use in the manufacture of windows, doors and the like commonly have two substantially parallel, spaced-apart glass panes spaced apart by a peripheral spacer. Spacers commonly are of metal, usually of tubular configuration, that are formed so as to have two flat, substantially parallel sides facing the confronting surfaces of the panes and bent so as to conform to the periphery of the glass panes. Sealant materials such as polyisobutylene are employed between the flat sides of the spacer and the confronting glass surfaces to seal the glass surfaces to the spacer. To enhance the thermal resistance across the glass assemblies, the interpane space may be filled with an insulating gas such as argon having a thermal conductivity that is less than that of air.

In the manufacture of insulating glass units, uniform production line procedures enable glass assemblies of a single size to be made in large quantities. Custom insulating glass units, on the other hand, are generally manufactured in quantities as small as a single unit, and a single order may require the manufacture of units having varying sizes and shapes.

Various methods and apparatuses have been suggested to enable air within the interpane space to be replaced with an insulating gas such as argon. In one method, the glass panes are adhered to a spacer to form a substantially sealed interpane space, and then air within the space is gradually replaced with argon through an access port. In another method, the interpane space of a multipane glass assembly is filled with an insulating gas by first drawing a vacuum to remove air from the interpane space before both panes are sealed to the spacer, and then charging the evacuated interpane space with an insulating gas. After the interpane space is filled with the insulating gas, the panes are sealed to the spacer.

Various methods and apparatuses for replacing air with an insulating gas in insulating glass units are shown in U.S. Pat. Nos. 5,017,252, 4,780,164, 5,573,618 (Rueckheim) and U.S. Pat. No. 5,476,124 (Lisec). In the last mentioned patent, an apparatus is described in which an insulating glass unit having a pair of glass panes separated by a peripheral spacer is conveyed by a conveyor belt between parallel plates, the bottom edge of the outer glass pane being spaced slightly away from the spacer to provide generally vertical openings along the side edges of the unit. The leading edges of the glass panes are conveyed into contact with a vertical sealing device. Another vertical sealing device is then moved into contact with the trailing edge of the glass panes to seal, with the gas-tight conveyor belt, the space between the glass panes. An insulating gas is then flowed laterally from one vertical sealing device to the other under conditions avoiding turbulence. When the glass unit has been appropriately filled with insulating gas, one plate is advanced toward the other to compress the glass unit between the plates and thus completely adhere the glass panes to the peripheral spacer. This device replaces air with an insulating gas in one glass unit at a time, and due to its employment of non-turbulent gas flow, requires considerable time to replace the air with insulating gas. It would be advantageous to provide a method and apparatus for filling one or a plurality of the same or different size insulating glass units at a time with an insulating gas in a manner providing rapid and substantially complete replacement of air.

Applicant's U.S. Pat. No. 5,957,169 teaches an apparatus and method of filling insulating glass with insulating gas. In accordance with this method, a partially assembled glass unit is conveyed within an enclosure. This partially assembled glass unit has a pair of spaced panes of glass and a peripheral spacer, with the lower edge of one pane being spaced from the spacer to provide a bottom gap. An insulating gas is introduced under turbulent flow conditions upwardly through the gap in the partially assembled glass unit to turbulently mix with the air present therein. A mixture of insulating gas and air is exhausted from the enclosure until the concentration of insulating gas within the enclosure reaches a desired level. The lower edge of the glass pane of the partially assembled glass unit is then closed against the spacer to seal the interpane space.

One problem encountered in manufacturing insulating glass assemblies is that the seal between one or both of the glass panes and the spacer fails. While this can happen over time, this defect more commonly occurs at the time of manufacture due to an improper application of the sealant about the periphery of the frame. In most cases, the sealant is not applied uniformly and relatively small, pin-hole-sized pathways through the seal remain even after the glass panes are urged into contact with the spacer.

Seal failures can cause a variety of problems in insulating glass units. For example, a seal imperfection will cause a leak of the insulating gas from the interpane space, and the pressure in the glass unit may decrease to a point where the pressure is no longer sufficient to support the upper pane, and this in turn may cause the upper pane of glass of the unit to bow or sag under its own weight. Moreover, such a leak can allow the introduction of moisture and other unwanted environmental elements, leading to a faulty glass unit. A leak in the seal can thus lead to eventual failure of the entire glass unit, resulting in the most extreme cases in a blowout of the glass panes and/or the spacer and seal.

It has proven difficult to reliably detect imperfections or failures in the peripheral seal provided by the spacer. Applicant has found that the upper pane of glass in larger units with inadequate seals will tend to sag slightly if the unit is laid with the panes oriented horizontally. It has been found useful in commercial production for over a year to fill the insulating glass unit with an insulating gas at roughly atmospheric pressure and profile the shape of the upper sheet of glass. The upper sheet of glass will tend to sag slightly in the center under its own weight, but the insulating gas in the interpane space of a properly sealed unit will help support the glass and limit its deflection. If the seal has a significant leak, though, the outer surface of the glass unit will tend to be concave. Such a concave profile indicates that insulating gas is being forced out of the interpane space under the weight of the upper glass pane, thereby lowering the pressure of gas within the glass unit and allowing the upper glass pane to sag under its own weight.

Unfortunately, this process is not a reliable indicator of seal failure in smaller glass units. In larger glass units, the center of the glass is spaced sufficiently far away from the spacer to permit measurable deflection. In smaller units, however, the distance between the supported edge of the upper pane and its center of mass is smaller. As a consequence, the bending moment on the glass often falls short of that necessary to consistently induce a sagging of the glass pane significant enough to fall outside standard manufacturing tolerances.

Hence, monitoring thickness of larger panes can serve as a reasonably reliable means for detecting inadequate seals in insulating glass units. In smaller units, though, this measure is not a strong, statistically reliable indicator of seal failure. It would be advantageous to provide a method for reliably detecting seal imperfections or failures in insulating glass units of varying sizes and shapes, in a manner providing rapid detection of imperfection or failure regardless of the size of the glass unit.

SUMMARY OF THE INVENTION

The present invention provides a method for detecting seal failures during manufacture of an insulated glass article, which typically has two generally parallel panes and a peripheral spacer between the panes and defining an interpane space. In one preferred embodiment, a partially assembled glass unit is positioned within an enclosure, the partially assembled glass unit having a first and second spaced glass panes and a peripheral spacer, an unsealed interpane space being defined therebetween. The enclosure is sealed with the partially assembled glass unit therein. An insulating gas is flowed into and insulating gas/air mixture is exhausted from the enclosure until the concentration of insulating gas within the enclosure reaches a predetermined value. The pressure within the interpane space is adjusted to a predetermined ambient gauge pressure, the ambient gauge pressure representing a predetermined offset from ambient atmospheric pressure. The panes are pressed against the spacer, sealing the interpane space to yield a sealed insulated glass article. Surface profiles of the first and second panes of the sealed insulated glass article are measured to determine a thickness profile and a fault indicator is generated if the thickness profile does not show at least a predetermined deviation from a predetermined baseline profile. Desirably, the predetermined gauge pressure is positive, i.e., the pressure in the interpane space prior to sealing is above the ambient atmospheric pressure. The interpane space in a properly sealed assembled insulated glass article consequently has a superatmospheric pressure, thereby causing the insulated glass article to have a convex thickness profile.

In alternative embodiment, the method comprises providing a gap between at least one of the panes and the spacer to permit communication with the interpane space. This partially assembled insulated glass article is placed within an enclosure. Gas is flowed into that gap and, preferably simultaneously, an insulating gas/air mixture is exhausted from the enclosure until the concentration of insulating gas within the enclosure reaches a predetermined value. The pressure within the interpane space is adjusted to a predetermined ambient gauge pressure, the ambient gauge pressure representing a predetermined offset from ambient atmospheric pressure. The panes are pressed against the spacer and the interpane space is sealed to yield a sealed insulated glass article. A surface profile of an upper one of the panes of the sealed insulated glass article is measured in a horizontal plane. If the surface profile does not show at least a predetermined flexure of the upper pane from a predetermined baseline profile, a fault indicator is generated.

In accordance with another specific embodiment of the invention, a partially assembled glass unit is placed within an enclosure, the partially assembled glass unit having a pair of spaced glass panes and a peripheral spacer, an unsealed interpane space being defined therebetween. An insulating gas is flowed into the unsealed interpane space and, preferably simultaneously, an insulating gas/air mixture is exhausted from the enclosure until the concentration of insulating gas within the enclosure reaches a predetermined value. Pressure within the unsealed interpane space is adjusted to a predetermined ambient gauge pressure, the ambient gauge pressure representing a predetermined offset from ambient atmospheric pressure. The panes are pressed against the spacer and the interpane space is sealed to yield an assembled glass unit. The assembled glass unit is oriented so that one of the panes is positioned generally above the other pane (e.g., by laying it generally horizontally) and a surface profile of the resulting upper pane is measured. A fault indicator is generated if the surface profile does not show at least a predetermined flexure of the upper pane from a predetermined baseline profile, that predetermined baseline profile reflecting anticipated flexure of the upper pane of an improperly sealed glass unit.

DETAILED DESCRIPTION OF THE PREFERRED EMBODIMENT

The method of the invention may be carried out using a variety of different mechanisms. One suitable mechanism (shown in the drawings and discussed in greater detail below) employs a pair of generally parallel platens mounted in a framework and powered so that one of the platens may move toward and away from the other while maintaining parallelism between the platens. Parallelism desirably is accomplished by driving the moveable platen through the use of co-acting screw drives positioned at the corners of the movable platen and powered by a single motor. Although both of the platens may move, it is desirable that one of the platens, referred to for convenience as the first platen, be stationary and that the other, second platen, be movable toward and away from the first platen.

The second platen is provided with a resilient, compressible seal extending about its periphery adjacent the edge of the platen and facing the peripheral edge of the first platen such that when the second platen is moved toward the first platen, the seal engages the first platen to form with the confronting platen surfaces an enclosure within which the replacement of air with argon or other insulating gas may occur.

Near its bottom, but yet within the enclosure, the first platen is provided with a horizontal conveyor for conveying partially assembled insulating glass units into and out of the apparatus. The conveyor preferably comprises a conveyor belt driven by rollers having axles journaled into the first platen and appropriately driven by a power source on the other side of the first platen from the enclosure. In this preferred device, the conveyor belt comprises an endless loop trained about the rollers, and is perforated so as to enable insulating gas to readily pass through it. Directly beneath the top horizontal run of the conveyor belt is an insulating gas manifold having upwardly facing apertures enabling an insulating gas to be forced upwardly through the perforations in the conveyor belt and into the interpane space of an insulating gas unit.

The conveyor may also take the form of, for example, a series of horizontally spaced rollers, at least some of which are driven, and upon which the partially assembled insulating glass unit may travel, spaces between the rollers permitting the upward flow of insulating gas. A conveyor belt is preferred, however, since its use avoids passing glass panes from one roller to another with possible consequent movement of either pane with respect to the other.

As used herein, "partially assembled insulating glass unit" refers to an insulating glass unit comprising a pair of glass panes which are spaced from one another by means of a continuous peripheral spacer extending between the panes, the spacer having generally flat, opposed surfaces facing confronting surfaces of the respective panes and sealable to the panes through the use of a suitable sealant such as a silicone or a polyisobutylene rubber. The spacer is sealed to the surface of the first pane, and the surface of the spacer that confronts the second of the two panes is provided with a sealant to which the confronting surface of the second pane may adhere when the second pane is pressed against the spacer. The upper edge of the second pane is adhered to the spacer, but the bottom edge of the second pane is spaced slightly from the spacer so as to provide a bottom gap defined by the confronting surface of the second glass pane at its lower edge and the peripheral spacer. The partially assembled glass unit thus has an inverted V configuration.

The partially assembled insulating glass unit as thus described may be manually fabricated in a generally upright position at an assembly station with the first pane laid back slightly against a surface provided with rollers to enable the pane to be conveyed easily and with the bottom edge of each of the glass panes supported on a conveyor that is aligned with the conveyor belt of the apparatus of the invention. With the platens spaced apart, the partially assembled insulating glass unit is moved onto the conveyor of the apparatus which itself moves the glass unit to an appropriate location between the platens. The bottom edges of the glass panes are supported against the upper surface of the conveyor belt. So as to harmonize with the remainder of the manufacturing process, as will be described in greater detail below, it is desired that the rear surface of the first pane be supported by the confronting surface of the first platen, although the unit could be reversed if desired. The surface of the first platen contains a plurality of perforations to which air under pressure is supplied to create a cushion of air upon which the first pane may slide as the glass unit is conveyed into and out of the apparatus.

The second platen is then moved toward the first platen to enable the peripheral, resilient seal carried by the second platen to seal against the first platen and to establish an enclosure between the platens. The conveyor belt that supports the bottom edges of the glass panes is itself included within the enclosure, and the second platen may be appropriately recessed near the bottom of the enclosure to accommodate the conveyor belt as the second platen closes upon the first. Desirably, the second platen at this stage in the process contacts the second glass pane at or near its edge and may move the bottom edge of the second pane slightly toward the spacer so as to provide a predetermined gap width between the spacer and the confronting surface of the second glass pane at its bottom.

A partial vacuum is quickly drawn within the enclosure, desirably to an ambient gauge pressure of minus several psi, e.g., minus about two psi (that is, to an actual pressure within the enclosure of about 12.7 psi for an ambient pressure of 14.7 psi), although the vacuum that is drawn may be substantially greater than this if desired. (As used herein, "ambient gauge pressure" is used to denote a pressure measurement wherein ambient atmospheric pressure is defined as zero.) If a greater vacuum is desired, the apparatus may utilize a separate vacuum tank of substantial volume in which a vacuum is drawn and which is opened to the interior of the enclosure to rapidly lower the pressure in the enclosure. However, if a vacuum of only several psi(g) is desired, the apparatus may simply utilize an air blower to exhaust air from the enclosure through an exhaust duct, and air may also be drawn from the enclosure by drawing air through the perforations formed in the first platen.

Once the pressure in the enclosure has quickly been reduced by the desired amount, e.g., for illustration, by about two psi utilizing an exhaust blower with a damper, the damper is closed and argon gas is jetted upwardly through perforations in the conveyor belt into the bottom gap in the partially assembled glass unit, the argon flowing upwardly within the interpane space in turbulent flow and mixing with air in the interpane space. Pressure in the enclosure accordingly rises. When the enclosure pressure has risen slightly above atmospheric pressure, e.g., to about two psi gauge pressure, the damper is again opened to exhaust the argon/air mixture in the enclosure. The flow rates of entering argon and air/argon exhaust may be adjusted so as to maintain a slightly positive pressure in the enclosure. A simpler system involves continuously flowing argon into the enclosure, as described, while intermittently opening the exhaust damper to cause the pressure in the enclosure to cycle in a narrow range, e.g., between 0.5 psi and 2.0 psi. As the cycle proceeds, the concentration of argon within the enclosure increases.

When the appropriate argon concentration is reached, e.g., about 97% argon by volume, the flow of gas into and out of the enclosure is regulated so as to provide a predetermined pressure within the enclosure. (This aspect of the method, including the determination of an appropriate predetermined pressure, is discussed more fully below.) At this point, the second platen is moved further toward the first platen, causing the bottom gap between the spacer and confronting glass surface to close and completing the seal between the second pane and the spacer. Air is admitted to the enclosure, either through appropriate duct work or through the above described perforations or both, and the second platen is moved away from the first platen a sufficient distance to enable the conveyor belt to convey the sealed insulating glass unit outwardly from between the platens to another stage in the manufacturing process.

From the above description, it will be understood that the surface of the conveyor upon which the lower edges of the glass panes rest must on the one hand grip the bottom surfaces strongly enough so that the bottom gap between the panes does not inadvertently and prematurely close, but yet must enable the bottom edge of one of the glass panes to slide easily into contact with the spacer when this is desired. To accomplish this, the conveyor belt or rollers may have smooth surfaces, but also may have appropriate downwardly extending shallow grooves in them to prevent inadvertent movement of the glass panes.

In the apparatus described above, the sealed insulating glass unit typically is in a substantially upright position. While it may remain upright during subsequent operation, it desirably is repositioned to a horizontal position and conveyed between the platens of a press in a subsequent manufacturing station, the glass panes being pressed toward one another by a sufficient amount so as to render uniform the thickness of the sealant about the periphery of the spacer and to bring the thickness of the entire glass unit and its periphery within desired tolerances. The very slight reduction in thickness that this step accomplishes decreases the interpane volume slightly and, consequently, increases the pressure of insulating gas within the interpane space.

For more than a year of commercial production, it has been found advantageous to maintain the pressure in the enclosure slightly below atmospheric pressure. In particular, the pressure in the loosely sealed interpane space before being pressed by the platens in the subsequent press has been less than 0.5 psi below ambient pressure, i.e., less than –0.5 psi gauge (psig). When the glass unit is pressed by the platens and the volume of the interpane space decreases slightly, this has been sufficient to bring that pressure up to atmospheric pressure or, less desirably, to slightly superatmospheric pressure.

From the pressing station thus described, the insulating glass unit travels beneath a thickness measuring device which measures the thickness of the glass unit across the width of the glass unit in the direction of travel as the glass unit moves past the measuring device. Thickness variances that exceed tolerable limits are signaled, e.g., by an audible tone.

If the pressure in the interpane space is greater than atmospheric pressure, the glass unit is found to have a slight bulge in its center, yielding a generally convex outer surface on one or both of the panes. The thickness of such a glass unit increases toward the center, yielding a convex thickness profile when thickness is plotted as a function of distance from one edge of the unit to an opposite edge of the unit. If the interpane space pressure is slightly less than atmospheric, the glass unit will have a cupped configuration wherein the outer surface of one or both panes is slightly concave, yielding a concave thickness profile.

If the profile of the surface of one pane (or, in a preferred alternative if the thickness profile of the glass unit) deviates from the targeted profile but not significantly enough to indicate an improperly seal unit, adjustments may be made to the gas filling device to reduce or increase the final pressure of argon within the interpane space at the end of the gas filling cycle. If desired, signals representing measured discrepancies in thickness may be employed to automatically adjust the final pressure in the gas filling apparatus. However, in normal commercial production for more than a year, it has been found that the necessary subatmospheric final pressures in the gas filling enclosure can be empirically determined quite closely for different sizes of glass units. As a result, bulging of glass units has very rarely been a problem during present procedures. Cupping of a glass unit with a targeted internal pressure approximately equal to or greater than ambient atmospheric pressure is also a rare problem in common practice, but a concave outer surface in such a unit commonly signals that the glass panes were not completely sealed to the spacer.

Following the thickness measuring step, the glass unit is conveyed to other manufacturing stations where, for example, additional sealant may be applied.

It will be understood that the glass units, from the point of their partial assembly just "upstream" from the gas exchange apparatus to the point of thickness measurement, are conveyed intermittently along the manufacturing line. Partial assembly may be a manual task in which one or more, commonly two or three or more, partially assembled glass units are provided on a conveyor belt with suitable spacing between them. Activation of the conveyor belt conveys the glass units as a batch onto the conveyor belt of the gas filling apparatus and thence into the apparatus between the platens, whereupon movement along the manufacturing line again halts during the gas exchange operation. Upon opening of the platens, the conveyor belt again is activated, moving the glass units as a batch onto a sequential series of aligned conveyors that convey the glass units to other manufacturing stations. In the course of their fabrication, the glass units are conveyed from one manufacturing station to another, and in many of these stations, the glass units are momentarily halted while a manufacturing operation is performed. In the gas exchange apparatus and in the pressing apparatus, the several glass units in a batch are concurrently subjected to the same manufacturing conditions. In the thickness measuring station, thickness is measured of one unit at a time, and this is done while the glass units are moving.

Figure 2:
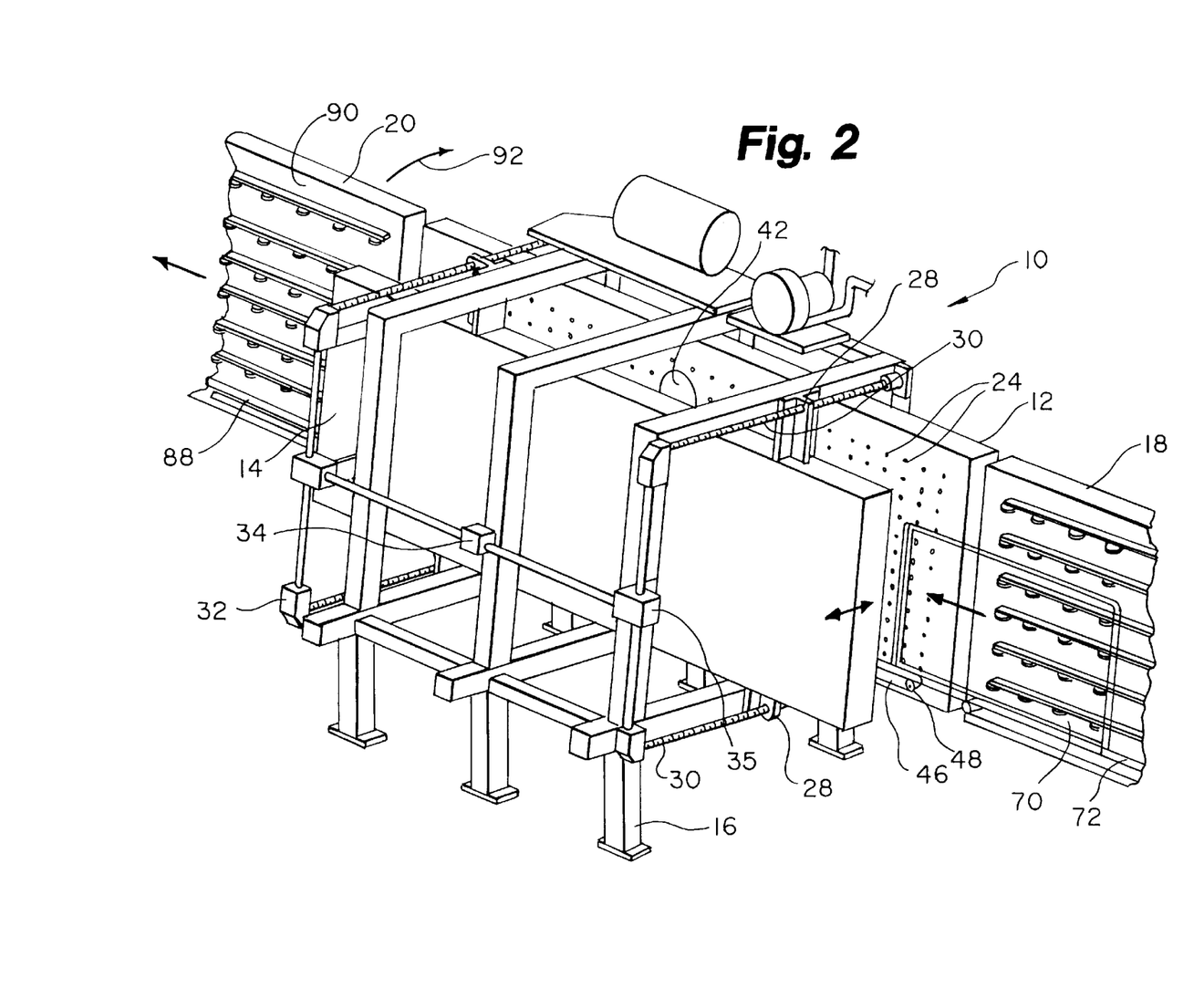
FIG. 2 is a perspective view of the apparatus of FIG. 1, illustrating a step in a method of the invention.

Referring now to FIG. 2, a gas filling device is shown generally as 10, and includes spaced, parallel, generally upright platens 12, 14 each supported by a rigid, ground-mounted framework 16. The apparatus 10 of the invention is part of a manufacturing line which includes a manual fabrication station 18 just upstream from the apparatus 10 and at which the partially assembled insulating glass units are manually fabricated, and a take away station 20 just downstream from the apparatus 10 to receive the sealed glass units from the apparatus 10.

Figure 1:
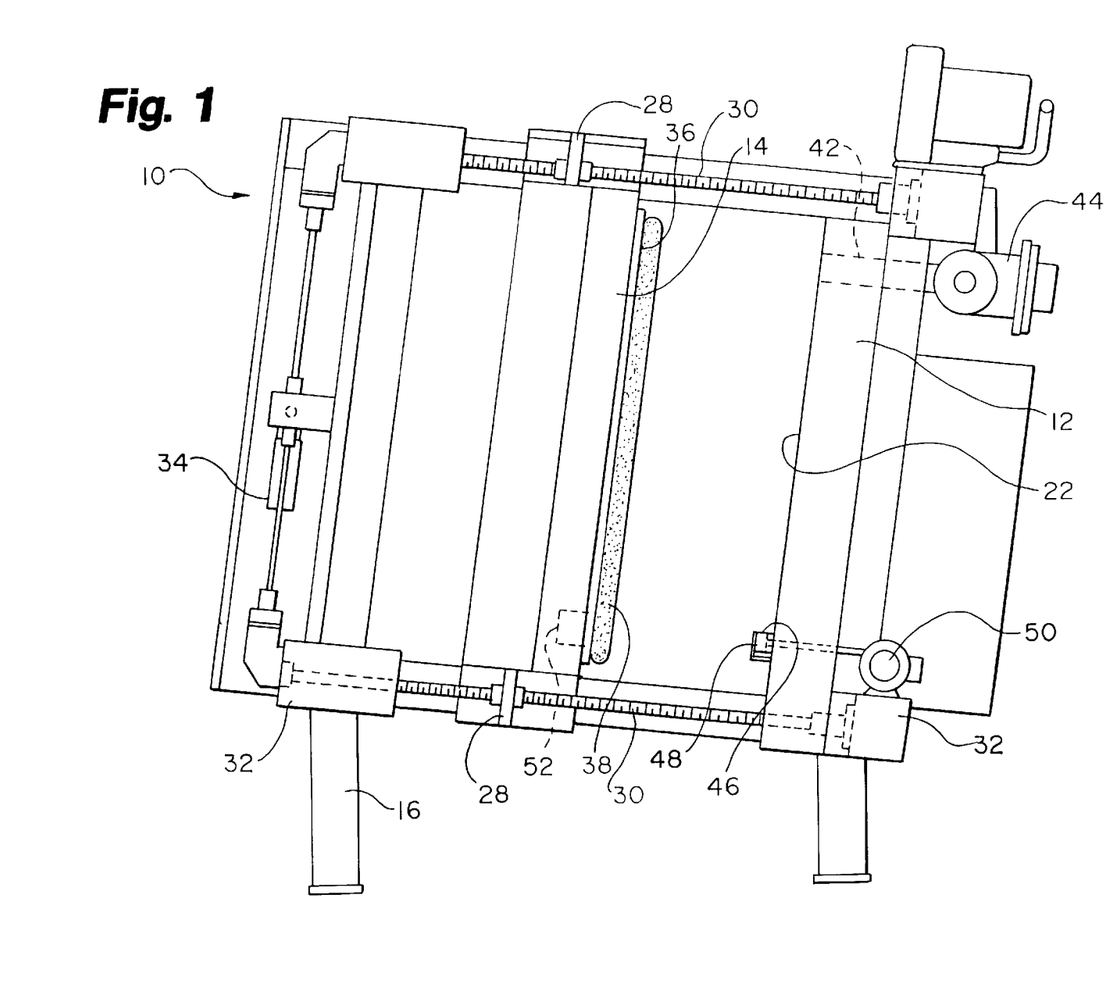
FIG. 1 is a side view of an apparatus useful in practicing a method of the invention, shown in its open position.
Figure 4:
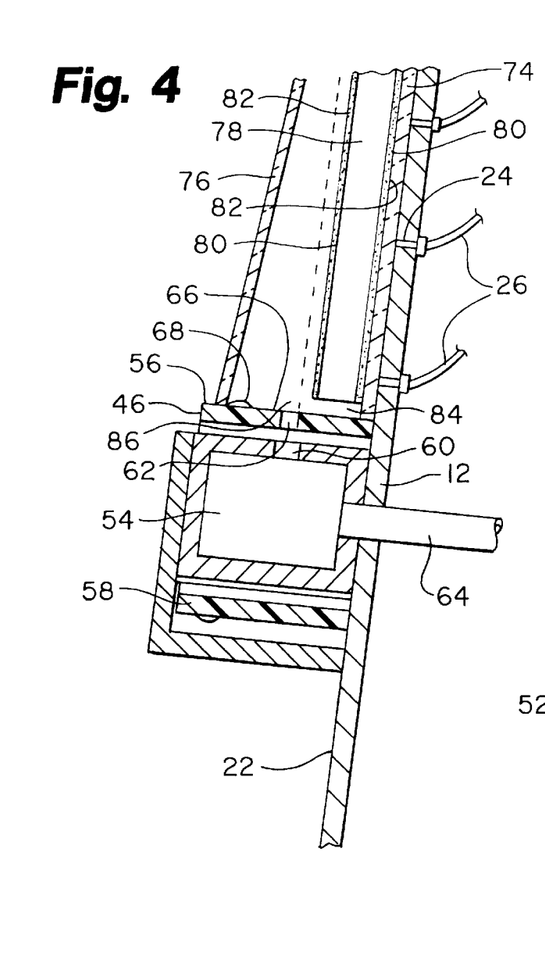
FIG. 4 is a broken away, cross sectional view showing a portion of the apparatus of FIG. 3.
Figure 5:
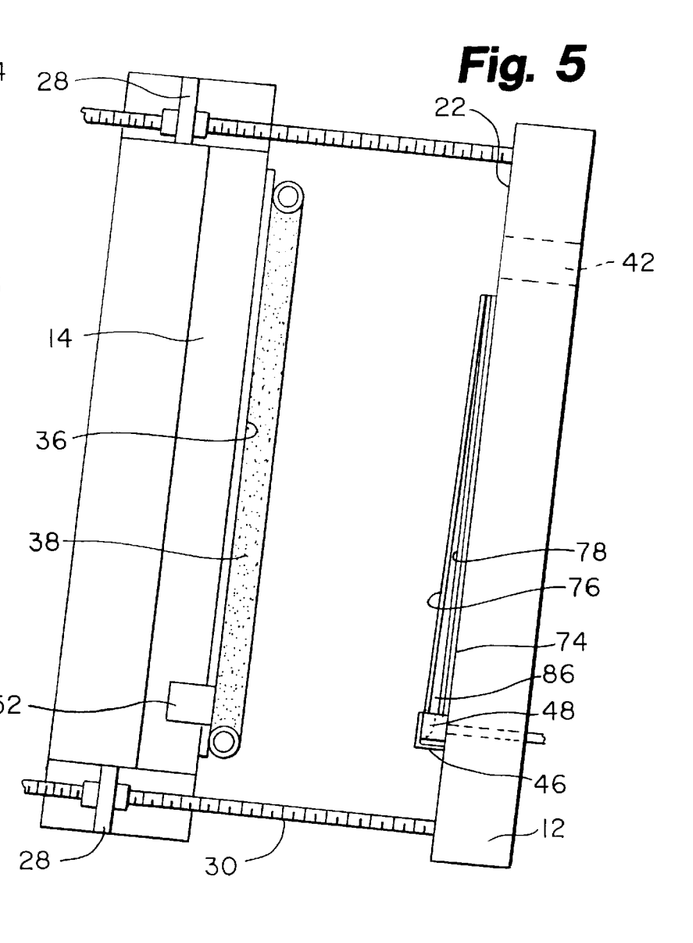
FIGS. 5, 6 and 7 are schematic views of an apparatus of the invention illustrating different stages in its use for replacing air with an insulating gas.

The first platen 12 desirably is non-movably mounted to the framework in a generally upright position but preferably is laid back slightly at an angle of about 7° to the vertical, as shown best in FIG. 1. The platens 12, 14 may be fabricated from heavy aluminum sheeting, and may include box-like struts (not shown) on their outwardly facing sides for strength to maintain flatness of their confronting surfaces 22. A series of perforations 24 is formed in the platen 12 to admit air under pressure through its surface 22 and through which an air/insulating gas mixture may be withdrawn. Desirably, each perforation includes its own supply tube 26, as shown in FIG. 4, the tubes 26 communicating via a bidirectional control valve with a manifold enabling air to enter the enclosure through the perforations 24 to "float" the glass units as they move across the surface 22 or to exhaust the air/insulating gas mixture from the enclosure.

The second platen 14 is generally rectangular in shape to match the shape of the platen 12, and includes, at its corners, bearing blocks 28 with internally threaded apertures to receive elongated screw drive members 30, the ends of which are journaled into frame-mounted blocks 32 and are driven by an electric motor 34. The elongated screw drive members are geared together through gear boxes 35 arranged in an "H" configuration so as to rotate at precisely the same rate and thus maintain parallelism between the platens 14 and 12 as the platen 14 moves toward and away from the platen 12. The gearboxes are sized to handle the loads that are encountered while simultaneously rapidly moving the platen 14.

Figure 3:
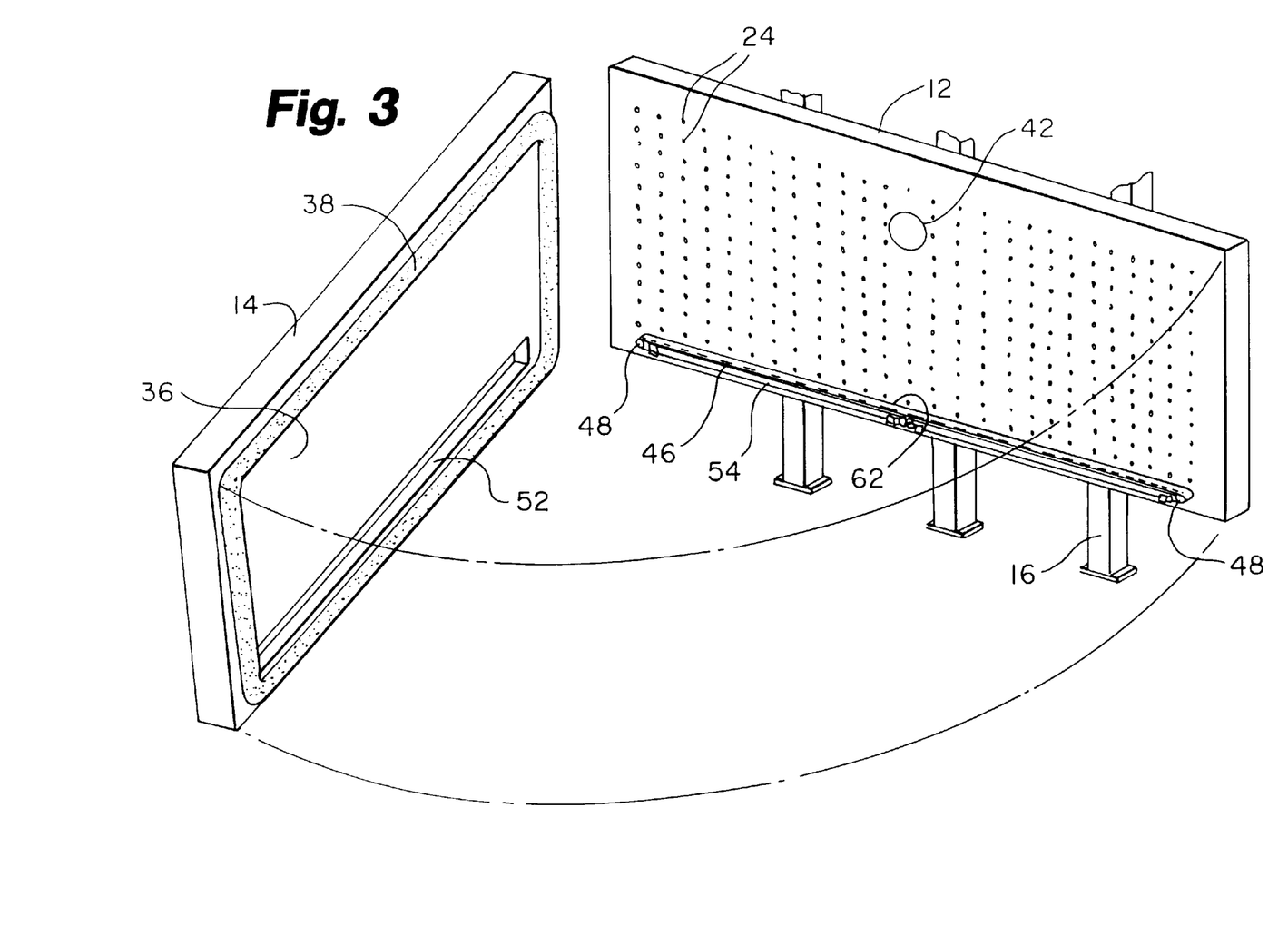
FIG. 3 is an exploded, largely schematic perspective view showing confronting faces of platens employed in the apparatus of FIGS. 1 and 2.
Figure 7:
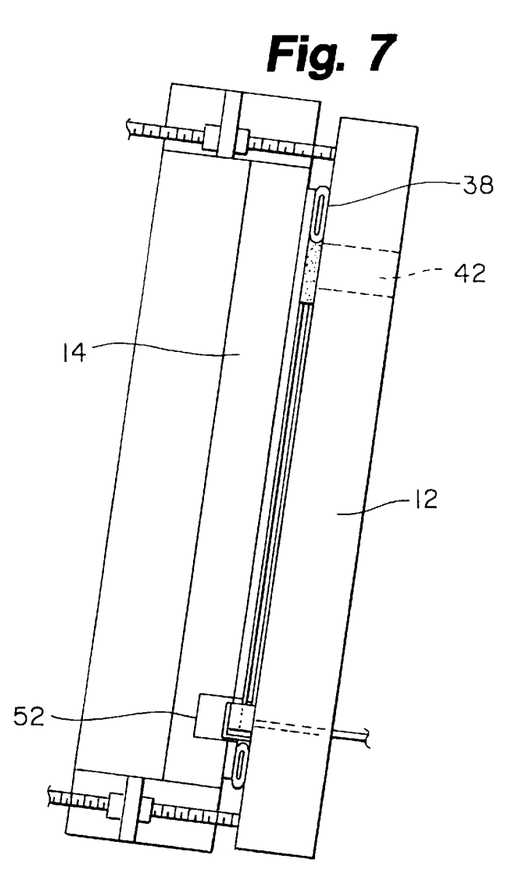

The platen 14 has a surface 36 that confronts the front surface 22 of the platen 12. Shown at 38 is a compressible, resilient seal 38 attached to the platen surface 36 adjacent the edges of the platen 14, the seal extending entirely around the periphery of the platen as shown best in FIG. 3. The peripheral seal may be adhered or otherwise attached to the surface 36, and preferably is formed of a resilient, tubular material such as polyurethane or rubber. As thus positioned, the seal comes into contact with and seals against the front surface 22 of the platen 12 as the platen 14 is moved toward the platen 12, the seal and the confronting surfaces of the platens defining an enclosure 40. The seal may be hollow, as depicted in the drawing, and has external apertures (not shown) for venting air or other gas within the seal when the seal is compressed as shown in FIG. 7. The hollow seal is sufficiently large so that, in use, it is not compressed by more than 50% and thus does not take on a significant permanent deformation or compression set due to substantial deformation of the seal.

In addition to the perforations 24 formed in the front surface of the platen 22, this platen additionally has an exhaust port 42 desirably formed approximately midway between its vertical edges and adjacent its upper edge, the port being positioned to communicate with the enclosure 40 defined by the seal 38. The exhaust port is coupled to an electrically driven exhaust blower 44 which can be controlled using a butterfly damper, by being turned on and off, or through the use of a high speed poppet control valve. Near its lower edge, the platen 12 includes a conveyor comprising an endless conveyor belt 46 trained at its ends about end rollers 48 located adjacent but spaced from the side edges of the platen 12, the rollers 48 and conveyor belt 46 being positioned so as to lie within the sealed enclosure 40 when the seal 38 seals against the platen 12. The rollers 48 may be journaled through the platen 12, as shown in FIG. 1, and may be driven by an electric motor 50 mounted to the framework at the rear of the platen 12. The platen 14 may have an elongated recess 52 adjacent its lower edge, as shown best in FIG. 3, to accommodate the conveyor belt and rollers when the platens are brought together as shown in FIG. 7.

A horizontally elongated gas manifold 54, as shown best in FIG. 4, is provided between the upper and lower runs 56, 58 of the conveyor belt 46, the manifold comprising an elongated tube having a generally rectangular cross section and containing, in its upper surface, a series of slots 60. The conveyor belt 46 also includes a series of perforations 62 positioned to come into generally vertical alignment with the slots 60. The interior of the manifold 54 communicates by means of one or more tubes 64 with a source (not shown) of argon or other insulating gas under pressure so that argon admitted to the manifold 54 is jetted upwardly through the slots 60 and perforations 62 into the interpane space. The surface 66 of the conveyor belt may, if desired, include a gently rounded elongated rib 68 to help support the outwardly spaced bottom edge of a second pane of a two-pane glass unit.

FIG. 2 depicts a partially assembled glass unit 70 that has been assembled in the manual fabrication station 18 upstream from the apparatus 10, this figure depicting the glass unit being supported on an upstream conveyor belt 72 which conveys the glass units onto the conveyor belt 46. As shown best in FIG. 4, the glass unit includes a first pane 74, a second glass pane 76, and an internal spacer 78. A thin sealant layer 80 is applied to each of the flat sides 82 of the spacer, and adheres the spacer to the peripheral edge portion of the first glass pane 74. Note, in FIG. 4, that the spacer 78 does not extend all the way to the edges of the glass panes 74, 76, there being a small space 84 between the spacer and the bottom edge of the panes. The bottom edges of the panes are supported by the upper surface 66 of the conveyor belt.

Once the partially assembled glass unit, or series of units, has been conveyed by the conveyor belt 46 between the platens 12, 14, the screw drive utilizing the elongated screw members 30 is energized and the platen 14 is moved toward the platen 12 until the resilient, compressible seal 38 contacts and presses against the platen 12 to seal the enclosure 40 and the lower edge of the glass pane 76 has come into contact with the surface 36 of the platen 14 and has been moved slightly toward the other pane 78 to provide the bottom gap 86 with a predetermined width. During conveyance of the glass units by the conveyor belt 46, air under pressure is admitted through the tubes 26 and perforations 24 to form a cushion of air between the surface 22 of the platen 12 and the adjacent pane surface, enabling that surface of the glass sheet 74 to slide readily across the surface 22.

Figure 10:
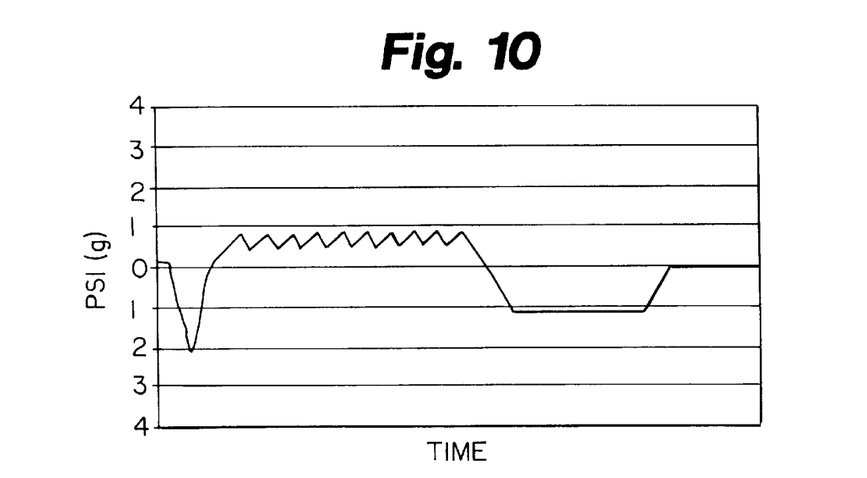
FIG. 10 is a graphical representation of pressure within an apparatus of the invention as a function of time during a single gas filling cycle.

At this point, a vacuum is pulled both within the tubes 26 (thereby anchoring the glass pane 74 to the platen surface 22) and through the duct 42. As shown in FIG. 10, the pressure within the enclosure is quickly reduced by about 2 psi. The exhaust port 42 is then dampered or valved shut, and argon is admitted under pressure into the manifold 54, the argon jetting upwardly through the slots and perforations 60, 62 and into the bottom gap 86 between the pane 76 and the spacer 80. The flow of argon is turbulent to cause rapid mixing with air in the interpane space. When pressure in the enclosure has reached approximately 0.7 psi (above atmospheric), the exhaust port is again dampered open. In the embodiment described, the flow of argon continues uninterruptedly, but the exhaust port is dampered open and shut to cycle the pressure within the enclosure between about 0.7 psi and 0.5 psi.

When the concentration of argon within the enclosure has reached the desired level—customarily about 97%—the exhaust port is closed and further evacuation of the enclosure takes place through the perforations 24 in the platen 12, the flow of argon and also evacuation ceasing as the pressure within the enclosure steadies at a predetermined level which, as is discussed in greater detail below, is desirably offset from ambient atmospheric pressure. The screw drive members 30 are again energized to move the platen 14 further toward the platen 12, that is, from the position shown in FIG. 6 to the position shown in FIG. 7. The compressible seal 38 is further compressed, as illustrated, and the second glass pane 76 is moved into contact with the sealant 80 on the confronting surface of the spacer 78. During this maneuver, the bottom edge of the pane 76 slides across the upper supporting surface of the conveyor belt. Once the interpane space has been sealed, as shown in FIG. 7; air is readmitted to the perforations 24, and the elongated screw drive members 30 are again energized, this time in the opposite direction to draw the platen 14 away from the platen 12. When the platen 14 has moved far enough so that the sealed glass units can clear the seal 38, the conveyor belt is again energized to draw the sealed insulating glass units to the left in FIG. 2 and onto the conveyor belt 88 of the takeaway station 20. Simultaneously, the conveyor belt 72 is energized to bring another series of partially assembled insulating glass units between the platens 12 and 14, and the procedure is repeated.

As illustrated in FIG. 2, the manual fabrication station 18 and takeaway station 20 both include conveyor belts that are aligned with the conveyor belt 46 of the gas exchange apparatus 10, and each of these stations 18, 20 includes a backboard having a series of rollers against which the confronting sheet of the first glass pane of each unit can roll easily as it is conveyed from station to station.

Figure 6:
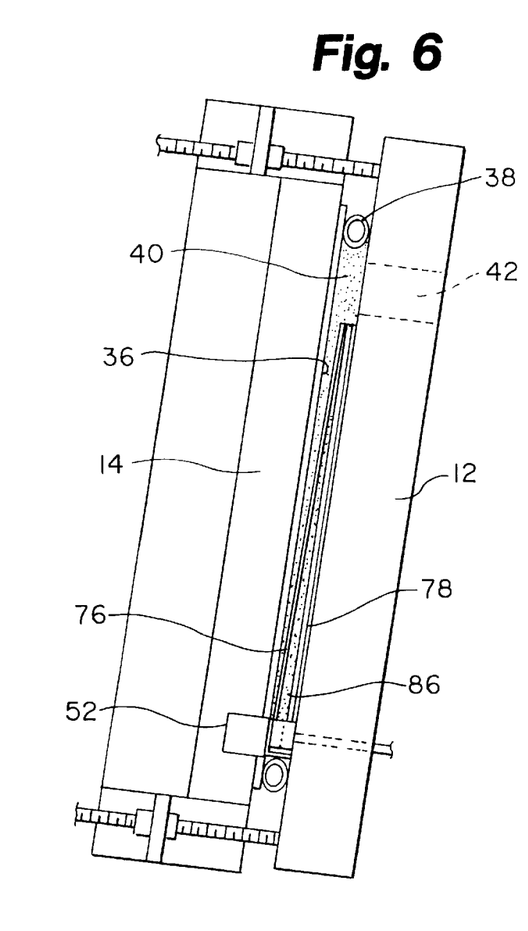

As thus described, the method of the invention involves the following timed stages:

a) From a first, open position in which completed glass units are conveyed outwardly and new, partially assembled units are conveyed between the platens, to the time that the platen 14 closes to a second position as shown in FIG. 6:—7 seconds.

b) Removal of sufficient air through the exhaust system to reduce pressure in the enclosure to a vacuum of about 2 psi:—2 seconds c) Admitting argon gas to the enclosure on a continuous basis, cycling the exhaust system until the desired argon concentration is reached, and altering pressure to slightly less than or more than atmospheric:—8 seconds d) Moving the platen 14 to a third position as shown in FIG. 7, thereby sealing the glass pane 76 to the spacer:—5 seconds e) Admitting air through the perforations 24 and withdrawing the platen 14 a sufficient distance to enable the now completed units to be conveyed outwardly:—4 seconds Total: 26 seconds In the foregoing example, a small vacuum was initially drawn within the enclosure. While argon was continuously charged to the enclosure in turbulent flow, the resulting argon gas mixture was exhausted from the enclosure in a series of intermittent steps. If desired, the flow rate of argon/air mixture from within the enclosure can be varied so that instead of employing a saw-toothed pattern as shown in FIG. 10, the pressure within the enclosure can be maintained fairly constant during the gas exchange procedure. Also, the admission of argon and exhausting of the resulting argon/air mixture may be varied as desired. For example, the enclosure may be subjected to cycles between fairly deep vacuums and fairly substantial pressures. If desired, the entire gas exchange may be conducted at a super atmospheric pressure or at a sub-atmospheric pressure. By restraining variations in pressure within the enclosure to a narrow range, e.g., within about 5 psi from atmospheric and preferably within about 2 psi from atmospheric, substantial stresses on the platens due to pneumatic loading are avoided, and this is the preferred embodiment. Moreover, cycling of the pressure within the compartment in the manner described above in connection with the saw-toothed lines in FIG. 10 enables the apparatus to make use of inexpensive gas regulating systems in that the exhaust system can merely be valved or dampered on and off.

Referring again to FIG. 2, once the sealed glass units are conveyed out of the apparatus by the takeaway station 20, the conveyor belt 88 of this station may be halted and the backboard 90 of the takeaway station may be pivoted downwardly into a horizontal position as shown by the arrow 92, whereupon for the rest of the manufacturing process, the series of glass units may travel in a horizontal plane. From the gas exchange apparatus 10, the series of glass units may pass between the horizontally extending, vertically spaced platens of a press, the platens and platen-moving mechanism of which may be substantially identical to that shown in FIG. 2. The platens are brought toward one another using commonly driven geared elongated screw drive members to press the glass panes together so as to cause the sealant layers 80 to thin somewhat, the pressure within the interpane space rising slightly as the glass unit is pressed to its desired thickness.

Figure 8:
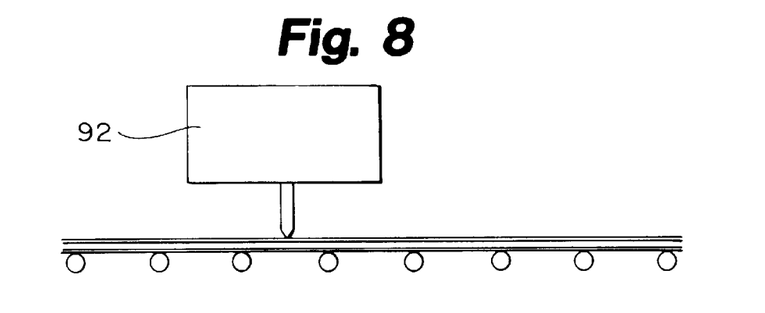
FIG. 8 is a broken away side view, largely schematic, of a measuring station useful in carrying out a method of the invention.
Figure 9:
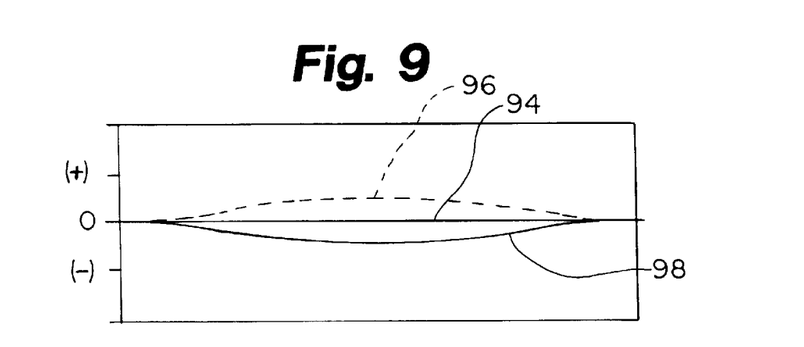
FIG. 9 is a graph schematically illustrating outputs from the measuring device of FIG. 8.

From the pressing station, the glass panes travel beneath a known ultrasonic thickness measuring device such as that shown in FIG. 8 as 92, this device generating a signal representative of the overall thickness of the unit at its center point from the leading edge of the unit to the trailing edge. FIG. 9 schematically illustrates a manner in which glass units have been manufactured for more than a year. In this graph, the abscissa represents the length from the leading to the trailing edge of each glass unit and the ordinate represents thickness. Line 94 represents the desired thickness which, in this case is a substantially completely horizontal surface profile. Line 96 represents a situation in which the interpane space has been slightly overfilled with argon and, as a result, the panes bulge slightly. Line 98 represents a slight cupping of the panes, indicating that either slightly too little argon was provided in the interpane space, or, more likely, that there is an imperfection in the seal 80 sealing the spacer to the panes and enabling gas to leak out of the interpane space. Tolerance limits are set up on either side of the set point 94 such that if a surface profile of a glass unit deviates outside the tolerance limits, a signal—commonly audible—is given and the offending glass unit may be removed from the line. If it is found that glass units continuously and reproducibly bulge beyond the tolerance limits, then adjustments in the final argon pressure within the enclosure of the gas exchange unit may be made. If a run of many glass units of the same size is being manufactured, the signal from the measuring device may be fed back directly to the gas filling system to adjust the final argon pressure. It has been found in normal practice, however, that different sizes of glass units require different, predetermined sub-atmospheric pressures of argon in the glass units as they leave the glass exchange apparatus in order for the resulting insulating glass unit to have substantially parallel panes of glass.

The goal in most prior art assembly systems has been to manufacture glass units wherein the panes of glass are as nearly parallel as is reasonably practical. In accordance with the present invention, however, the pressure of gas in the interpane space is intentionally significantly different from ambient atmospheric pressure, causing at least one of the panes to take on a readily measurable deviation or flexure from a predetermined baseline profile. This significant pressure differential with respect to ambient atmosphere also forces a change in the glass unit if the seal is inadequate. In particular, if the seal is improper, the pressure in the interpane space will tend to equilibrate with ambient pressure. By way of example, if the pressure in a properly sealed interpane space is 2 psi less than ambient pressure (yielding an ambient gauge pressure of −2 psi) and a leak develops in the seal, air will be drawn into the interpane space through the leak. This will result in a less concave upper surface than would be achieved if the ambient gauge pressure were maintained at about −2 psi.

The predetermined pressure differential between the unsealed interpane space just prior to sealing and ambient pressure should be selected to achieve a specifically desired final pressure in the interpane space of the assembled glass unit. As noted above, pressing the panes against the spacer in the horizontal press increases the pressure in the interpane space. Hence, the pressure in the sealed interpane space will be greater than the pressure in the gas filling enclosure (and the initially unsealed interpane space). The pressure increase attributable to compression of the sealant between the spacer and one or both of the frames is fairly predictable for any given glass unit size, with pressure increases of no more than about 1 psi being typical. Consequently, the ambient gauge pressure of the enclosure at the end of the gas exchange process should be selected to be slightly less than the final target pressure in a properly sealed interpane space.

The predetermined pressure differential in the gas filing enclosure should be sufficient to produce a readily measurable, statistically significant flexure of one or both panes of the assembled glass unit. However, the pressure differential should not be so great as to place undue strain on the seal or the glass panes themselves to avoid failure of the units when they are placed in the field, e.g. when barometric pressure changes significantly as a storm approaches.

The minimum pressure differential yielding a readily detectable, statistically significant cupping or bowing of the insulated glass unit will vary somewhat with the size of the unit, with smaller glass units exhibiting less flexure than larger glass units at the same pressures. It is expected that suitable ambient gauge pressures to yield a flexure of the upper pane in a horizontal assembled glass unit which is sufficient to readily differentiate a properly sealed unit from an inadequately sealed unit which has substantially equilibrated its interpane space with ambient atmospheric pressure would be on the order of 0.5–2.5 psi, with the optimum pressure depending on the nature of the glass unit being filled and whether the unit is being intentionally overfilled or underfilled. The intentionally introduced pressure differential may, for example, be less when the pressure in the glass unit is less than ambient pressure than it might be when the glass unit is overfilled. While it is preferred that any positive pressure differential (i.e. when the pressure in the sealed unit is greater than ambient) be at least 1 psi, negative pressure differentials as low as 0.5 psi might be sufficient to allow one to reliably detect an inadequate seal. The size of the glass units and the thickness/stiffness of the panes of glass used to form the unit may also affect the required pressure. For example, on smaller units, a positive pressure differential of about 1 psi is likely to be sufficient, while in larger insulated glass units pressures of 1–2 psi may be used.

In determining the acceptability of a given insulated glass unit, one measures the deviation of the surface profile (usually in a horizontal direction) of the upper pane from a baseline profile reflecting anticipated flexure of the upper pane of an improperly sealed glass unit. If so desired, this baseline profile may simply be assumed for manufacturing purposes to be essentially horizontal and units which do not deviate at least a predetermined distance from a horizontal profile will be flagged as unacceptable. As explained above, this baseline profile likely will not be horizontal, particularly for larger insulated glass units. While this baseline profile would have to be determined somewhat empirically, it is fairly simple to generate effective estimates if the dimensions of the units and the glass thickness are known.

Figure 11:
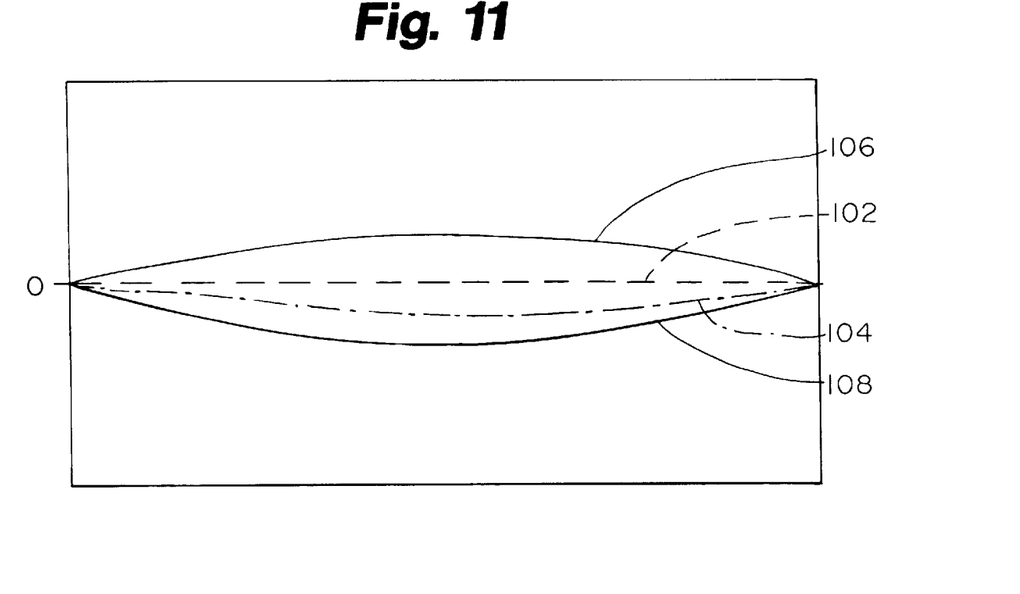
FIG. 11 is a graph schematically illustrating outputs from the measuring device of FIG. 8 illustrating a surface profile for a large assembled glass unit with a properly sealed interpane space and a base line of an anticipated surface profile for such a unit with an improperly sealed interpane space.

FIG. 11 schematically illustrates a series of glass unit profiles for larger glass units. As with FIG. 9, in this graph the abscissa represents the length from the leading to the trailing edge of each glass unit and the ordinate represents thickness. (As with FIG. 9, FIG. 11 is merely schematic and the abscissa and ordinate scales are significantly different to highlight the slight thickness changes.) Dashed line 102 is horizontal, representing an insulated glass unit with parallel panes. Line 104 is an alternative baseline profile, reflecting the natural flexure of the glass one would expect if the interpane space were at atmospheric pressure, e.g. if the seal had a substantial breach therein, and the upper pane sagged downwardly toward the lower pane under its weight. While the curved line 104 may yield tighter quality control, either line 102 or 104 may be selected as the baseline profile for manufacturing purposes.

Line 106 represents an insulated glass unit in which the interpane space intentionally has been filled to a predetermined superatmospheric pressure and, as a result, the surface profile of the upper pane is slightly convex. Line 108 represents an insulated glass unit in which the interpane space intentionally has been filled to a predetermined subatmospheric pressure and, as a result, the surface profile of the upper pane is slightly concave. In determining whether a particular unit has an acceptable seal, the surface profile of that unit will be compared to the selected baseline profile (e.g., lines 102 or 104). While the profiles may be compared at multiple points, that is not believed necessary. Instead, one may simply compare the maximum deviation of the measured surface profile and the maximum deviation of the baseline profile from a fixed standard, e.g. horizontal.

For example, surface profile 106 reaches its maximum deviation from horizontal about halfway along its length and the horizontal baseline 102 does not deviate from horizontal. Hence, if the maximum height of the curve 106 is not at least some predetermined distance from horizontal, one can assume that an inordinate amount of the gas in the superatmospheric interpane space has escaped and the unit may be determined to be defective. Typically, one will define acceptable tolerance limits of this maximum deviation for any given size and shape of glass unit and if a surface profile of a particular glass unit deviates outside the tolerance limits, a signal—commonly audible—is given and the offending glass unit may be removed from the line.

Figure 12:
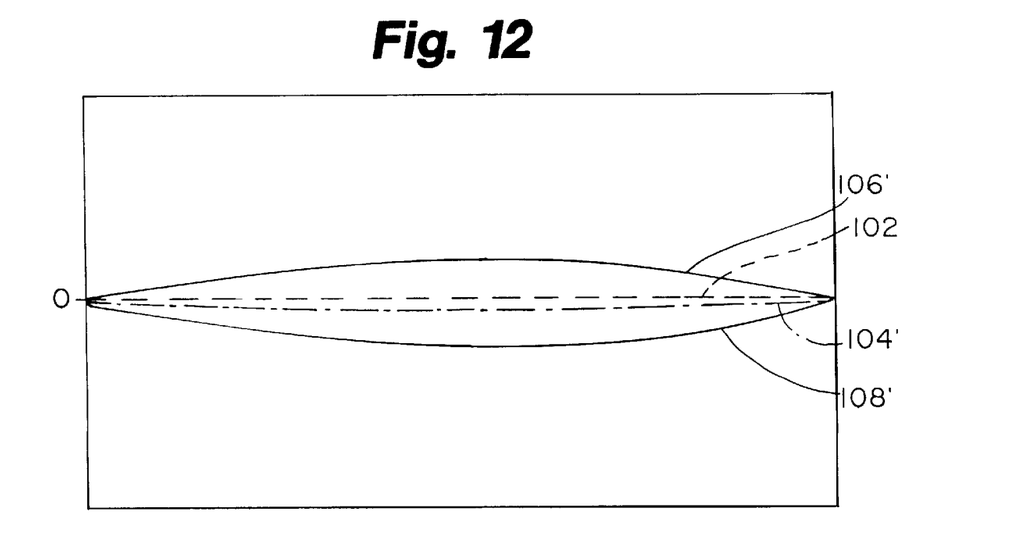
FIG. 12 is a graph schematically illustrating outputs from the measuring device of FIG. 8 illustrating a surface profile for a small assembled glass unit with a properly sealed interpane space and a base line of an anticipated surface profile for such a unit with an improperly sealed interpane space.

FIG. 12 is similar to FIG. 11, but illustrates similar curves for smaller insulated glass units. In particular, line 102 is an idealized horizontal baseline profile, line 104' represents a baseline profile of a unit having atmospheric pressure in the interpane space, line 106' is a surface profile for an intentionally overfilled unit having a positive ambient gauge pressure in its interpane space and line 108' is a surface profile for an intentionally underfilled unit having a negative ambient gauge pressure in its interpane space. The same principles apply to these curves as the analogous curves in FIG. 11, but comparison of the baseline profile 104 in FIG. 11 to the baseline profile 104' in FIG. 12 highlights the greater stiffness, and hence less significant natural sagging, of the smaller unit.

Figure 13:
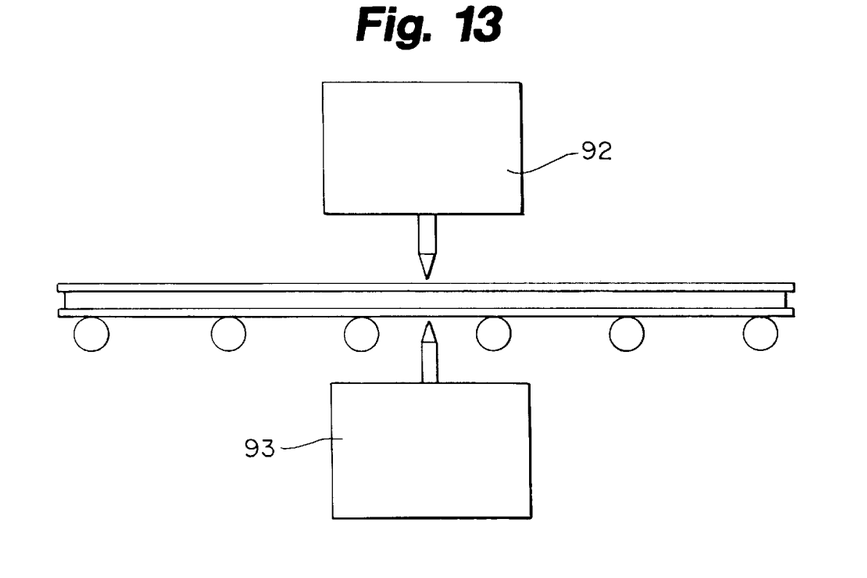
FIG. 13 is a broken away side view, largely schematic, of an alternative measuring station useful in carrying out a method of the invention.

FIG. 13 illustrates a modification of the thickness measuring device 92 shown in FIG. 8. FIG. 8 schematically shows a system which measures just the upper surface of the glass unit. If one were to assume that the bottom pane of the glass unit will not cup or bulge significantly, measuring just the upper surface would provide a reliable indication of the condition of the unit as a whole. By virtue of the weight of the glass unit bearing down on the rollers, such an empirical assumption that he bottom surface of the glass unit is relatively flat may be perfectly acceptable for many modes of operation.

FIG. 13 schematically illustrates a slightly different thickness measurement system, wherein an upper ultrasonic position sensor 92 is positioned above the sealed insulated glass unit and a lower ultrasonic position sensor 93 is positioned beneath the sealed insulated glass unit. This will enable one to measure a surface profile of the upper pane, much like that shown in FIGS. 11 and 12, using the upper sensor 92 and a similar surface profile of the lower pane using the lower sensor 93. By comparing these two curves, one can determine the thickness of the glass at any measured point.

Figure 14:
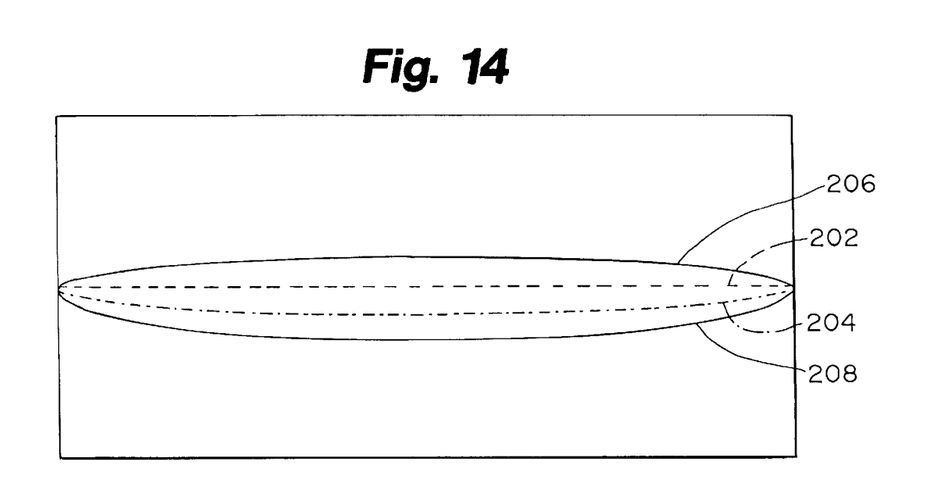
FIG. 14 is a graph schematically illustrating outputs from the measuring device of FIG. 13 illustrating a thickness profile for a large assembled glass unit with a properly sealed interpane space and a base line of an anticipated thickness profile for such a unit with an improperly sealed interpane space.

Typically, the glass will be passed horizontally between the two stationary sensors, yielding a plot of the thickness along a path extending from one edge of the glass unit to the opposite edge of the glass unit. FIG. 14 illustrates an idealized plot of the thickness of the glass unit generated in this fashion. Horizontal line 202 in FIG. 14 would be found when the upper surface and the lower surface of the glass unit are parallel to one another, yielding a constant thickness. Since it is unlikely that one surface will be concave and the other convex, this indicates that both of the panes are likely substantially flat.

Line 206 represents an insulated glass unit in which the interpane space intentionally has been filled to a predetermined superatmospheric pressure and, as a result, the center of the glass unit bulges somewhat. Thickness profile 206 reflects this bulging in that the line is slightly convex. In particular, this line 206 is higher (indicating a greater thickness) in the middle and curves downwardly (indicating it is getting thinner) toward either end. Line 204 is an alternative baseline thickness profile, reflecting the natural thickness profile one might expect if the interpane space were at atmospheric pressure, e.g. if the seal had a substantial breach therein, and the upper pane sagged downwardly toward the lower pane under its weight. Line 208 represents an insulated glass unit in which the interpane space intentionally has been filled to a predetermined subatmospheric pressure and, as a result, the thickness profile of the glass unit is slightly concave. In particular, this line 208 is lower (indicating it is thinner) in the middle and curves upwardly (indicating it is getting thicker) toward either end.

In determining whether a particular unit has an acceptable seal, the thickness profile of that unit will be compared to the selected baseline profile (e.g., lines 202 or 204). While the profiles may be compared at multiple points, that is not believed necessary. Instead, one may simply compare the maximum deviation of the measured thickness profile and the maximum deviation of the baseline profile from a fixed standard, e.g. horizontal.

Unlike prior art approaches which cannot use cupping or bowing as reliable indicators of seal integrity for smaller insulated glass units, the present invention provides a method for reliably detecting seal imperfection or failures in all sizes of glass units. This is true whether the predetermined ambient gauge pressure for the gas exchange enclosure is superatmospheric or subatmospheric. If a positive ambient gauge pressure is selected, this overfilling of the interpane space will result in a bulging glass unit having a convex surface profile of both panes and a convex thickness profile. If a seal imperfection exists, the pressurized gas contained within the interpane space will leak, causing the bulge to decrease and yielding a surface profile and a thickness profile which do not exhibit the expected flexure from the baseline profile (e.g., horizontal line 102 or sagging curve 104 in FIG. 11 or horizontal line 202 in FIG. 14). In addition to providing a simple, effective method for automatically ensuring the integrity of the seal in each and every glass unit, such overfilling of the unit would also help increase the insulative capacity (e.g., the R-value) of the unit.

In another embodiment, the interpane space is filled with insulating gas to a subatmospheric pressure. This underfilling of the interpane space will result in cupping of the glass unit, since, when rotated into a horizontal plane, the unit will display an upper glass pane that sags under its own weight, thereby causing a concave surface on the outside surface of one or both of the panes and a concave thickness profile of the glass unit. Again, the resulting glass unit can be measured using a known ultrasonic thickness measuring device such as that shown in FIG. 8 or in FIG. 13, the device generating a signal representative of the overall thickness of the unit at its center point from the leading edge of the unit to the trailing edge. The measured thickness can be compared with an expected thickness, calculated based upon the amount of gas introduced into the interpane space. If a seal imperfection exists, the gas contained within the interpane space will leak, causing an exaggerated cupping of the glass unit.

Thus, the present invention rapidly and reproducibly exchanges argon or other insulating gas for air within a partially assembled glass unit, and provides a mechanism for easily detecting seal failures. While a preferred embodiment of the present invention has been described, it should be understood that various changes, adaptations and modifications may be made therein without departing from the spirit of the invention and the scope of the appended claims.

What is claimed is:

1. A method for detecting seal failures during manufacture of an insulated glass unit, comprising:

a) placing a partially assembled glass unit within an enclosure, the partially assembled glass unit having a first and second spaced glass panes and a peripheral spacer, an unsealed interpane space being defined therebetween;

b) sealing the enclosure with the partially assembled glass unit therein;

c) flowing an insulating gas into and exhausting insulating gas/air mixture from the enclosure until the concentration of insulating gas within the enclosure reaches a predetermined value;

d) adjusting the pressure within the interpane space to a predetermined ambient gauge pressure, the ambient gauge pressure representing a predetermined offset from ambient atmospheric pressure;

e) pressing the panes against the spacer and sealing the interpane space to yield a sealed insulated glass article; and f) measuring surface profiles of the first and second panes of the sealed insulated glass article to determine a thickness profile and generating a fault indicator if the thickness profile does not show at least a predetermined deviation from a predetermined baseline profile.

2. The method of claim 1 further comprising orienting the sealed insulated glass article generally horizontally prior to measuring the surface profile.

3. The method of claim 2 wherein the first pane is positioned generally above the second pane when the sealed insulated glass article is horizontally oriented.

4. The method of claim 1 wherein the predetermined gauge pressure is positive, i.e., the pressure in the interpane space prior to sealing is above the ambient atmospheric pressure.

5. The method of claim 4 wherein the superatmospheric pressure in the sealed interpane space is at least about 1 psi above the ambient atmospheric pressure.

6. The method of claim 5 wherein the superatmospheric pressure in the sealed interpane space is between about 1 and about 2 psi above the ambient atmospheric pressure.

7. The method of claim 4 wherein the interpane space in a properly sealed assembled insulated glass article has a superatmospheric pressure, thereby causing the insulated glass article to have a convex thickness profile.

8. The method of claim 4 wherein the interpane space in a properly sealed insulated glass article has a superatmospheric pressure, thereby causing the first pane to have a convex surface profile.

9. The method of claim 4 wherein the interpane space in a properly sealed insulated glass article has a superatmospheric pressure, thereby causing each of the first and second panes to have a convex surface profile.

10. The method of claim 1 wherein the predetermined gauge pressure is negative, i.e., the pressure in the interpane space prior to sealing is below the ambient atmospheric pressure.

11. The method of claim 10 wherein the sealed interpane space has a subatmospheric pressure, thereby causing the first pane to have a concave surface profile.

12. The method of claim 10 wherein the subatmospheric pressure in the sealed interpane space is at least about 0.5 psi below the ambient atmospheric pressure.

13. The method of claim 1 wherein pressing the panes against the spacer compresses a sealant between the spacer and at least one of the panes, thereby increasing pressure in the interpane space.

14. The method of claim 13 wherein the step of pressing the panes is performed prior to measuring the surface profile.

15. A method for detecting seal failures during manufacture of an insulated glass article having first and second panes and a peripheral spacer between the panes and defining an interpane space, the method comprising:

a) providing a gap between at least one of the panes and the spacer to permit communication with the interpane space;

b) positioning the insulated glass article within a sealed enclosure;

c) flowing an insulating gas into and exhausting insulating gas/air mixture from the enclosure until the concentration of insulating gas within the enclosure reaches a predetermined value;

d) adjusting the pressure within the interpane space to a predetermined ambient gauge pressure, the ambient gauge pressure representing a predetermined offset from ambient atmospheric pressure;

e) pressing the panes against the spacer and sealing the interpane space to yield a sealed insulated glass article; and f) measuring a surface profile of the first pane of the sealed insulated glass article and generating a fault indicator if the surface profile does not show at least a predetermined flexure of the first pane from a predetermined baseline profile.

16. The method of claim 15 further comprising measuring a surface profile of the second pane of the sealed insulated glass article to determine a thickness profile.

17. The method of claim 16 wherein the first pane is positioned generally above the second pane when the sealed insulated glass article is horizontally oriented.

18. The method of claim 15 further comprising orienting the sealed insulated glass article generally horizontally prior to measuring the surface profile.

19. The method of claim 15 wherein the predetermined gauge pressure is positive, i.e., the pressure in the interpane space prior to sealing is above the ambient atmospheric pressure.

20. The method of claim 19 wherein the interpane space in a properly sealed insulated glass article has a superatmospheric pressure, thereby causing the first pane to have a convex surface profile.

21. The method of claim 20 wherein the superatmospheric pressure in the sealed interpane space is at least about 1 psi above the ambient atmospheric pressure.

22. The method of claim 21 wherein the superatmospheric pressure in the sealed interpane space is between about 1 psi and about 2 psi above the ambient atmospheric pressure.

23. The method of claim 19 wherein the interpane space in a properly sealed assembled insulated glass article has a superatmospheric pressure, thereby causing the insulated glass article to have a convex thickness profile.

24. The method of claim 15 wherein the predetermined gauge pressure is negative, i.e., the pressure in the interpane space prior to sealing is below the ambient atmospheric pressure.

25. The method of claim 24 wherein the predetermined thickness profile is one of concave or substantially flat, said fault indicator being generated if the thickness profile is not convex.

26. The method of claim 24 wherein the sealed interpane space has a subatmospheric pressure, thereby causing the first pane to have a concave surface profile.

27. The method of claim 26 wherein the subatmospheric pressure in the sealed interpane space is at least about 0.5 psi below the ambient atmospheric pressure.

28. The method of claim 24 wherein the predetermined baseline profile is one of concave or substantially flat, said fault indicator being generated if the surface profile is not convex.

29. The method of claim 15 wherein pressing the panes against the spacer compresses a sealant between the spacer and at least one of the panes, thereby increasing pressure in the interpane space.

30. The method of claim 29 wherein the step of pressing the panes is performed prior to measuring the surface profile.

31. A method for detecting seal failures during manufacture of an insulated glass unit, comprising:

a) positioning a partially assembled glass unit within a sealed enclosure, the partially assembled glass unit having a pair of spaced glass panes and a peripheral spacer, an unsealed interpane space being defined therebetween;

b) flowing an insulating gas into and exhausting insulating gas/air mixture from the enclosure until the concentration of insulating gas within the enclosure reaches a predetermined value;

c) adjusting the pressure within the unsealed interpane space to a predetermined ambient gauge pressure, the ambient gauge pressure representing a predetermined offset from ambient atmospheric pressure; pressing the panes against the spacer and sealing the interpane space to yield an assembled glass unit; and d) orienting the assembled glass unit so that one of the panes is positioned generally above the other pane, measuring surface profiles of the upper and lower panes of the sealed insulated glass article to determine a thickness profile and generating a fault indicator if the thickness profile does not show at least a predetermined deviation from a predetermined baseline profile reflecting anticipated relative flexure of the first and second panes of an improperly sealed glass unit.

32. The method of claim 31 wherein the predetermined ambient gauge pressure is positive, i.e., the pressure in the unsealed interpane space prior to sealing is above the ambient atmospheric pressure.

33. The method of claim 32 wherein the interpane space in a properly sealed assembled insulated glass article has a superatmospheric pressure, thereby causing the upper pane to have a convex surface profile.

34. The method of claim 32 wherein the interpane space in a properly sealed assembled insulated glass article has a superatmospheric pressure, thereby causing the insulated glass article to have a convex thickness profile.

35. The method of claim 32 wherein the superatmospheric pressure in the sealed interpane space is at least about 1 psi above the ambient atmospheric pressure.

36. The method of claim 35 wherein the superatmospheric pressure in the sealed interpane space is between about 1 psi and about 2 psi above the ambient atmospheric pressure.

37. The method of claim 36 wherein the interpane space in a properly sealed assembled insulated glass article has a subatmospheric pressure, thereby causing the upper pane to have a concave surface profile.

38. The method of claim 37 wherein the subatmospheric pressure in the sealed interpane space is at least about 0.5 psi below the ambient atmospheric pressure.

39. The method of claim 36 wherein the predetermined baseline profile is one of concave or substantially flat, said fault indicator being generated if the surface profile is not convex.

40. The method of claim 31 wherein the predetermined ambient gauge pressure is negative, i.e., the pressure in the interpane space prior to sealing is below the ambient atmospheric pressure.

41. The method of claim 31 wherein pressing the panes against the spacer compresses a sealant between the spacer and at least one of the panes, thereby increasing pressure in the interpane space.

42. A method for detecting seal failures during manufacture of an insulated glass unit, comprising:

a) placing a partially assembled glass unit within an enclosure, the partially assembled glass unit having a pair of spaced glass panes and a peripheral spacer, an unsealed interpane space being defined therebetween;

b) flowing an insulating gas into said unsealed interpane space and simultaneously exhausting insulating gas/air mixture from the enclosure until the concentration of insulating gas within the enclosure reaches a predetermined value;

c) adjusting the pressure within the unsealed interpane space to a predetermined ambient gauge pressure of at least about 0.5 psi below ambient atmospheric pressure;

d) pressing the panes against the spacer and sealing the interpane space to yield an assembled glass unit; and e) orienting the assembled glass unit so that one of the panes is positioned generally above the other pane, measuring a surface profile of the upper pane, and generating a fault indicator if the surface profile is not significantly more concave than a predetermined baseline profile reflecting anticipated flexure of the upper pane of an improperly sealed glass unit.

43. The method of claim 42 wherein pressing the panes against the spacer compresses a sealant between the spacer and at least one of the panes, thereby increasing pressure in the interpane space.

44. The method of claim 43 wherein the pressure of the sealed interpane space of the assembled glass unit is still at least about 0.5 psi below ambient atmospheric pressure.

* * * * *